United States Patent
Fu et al.

(10) Patent No.: US 12,539,606 B2
(45) Date of Patent: Feb. 3, 2026

(54) METHOD AND APPARATUS FOR COMPENSATING BOOM DEFLECTION, AND METHOD AND APPARATUS FOR CONTROLLING BOOM

(71) Applicant: ZOOMLION HEAVY INDUSTRY SCIENCE AND TECHNOLOGY CO., LTD., Changsha (CN)

(72) Inventors: Ling Fu, Changsha (CN); Haojie Pi, Changsha (CN); Yanbin Liu, Changsha (CN); Li Yin, Changsha (CN); Lingjuan She, Changsha (CN); Xiaoying Yu, Changsha (CN)

(73) Assignee: ZOOMLION HEAVY INDUSTRY SCIENCE AND TECHNOLOGY CO., LTD., Changsha (CN)

( * ) Notice: Subject to any disclaimer, the term of this patent is extended or adjusted under 35 U.S.C. 154(b) by 62 days.

(21) Appl. No.: 18/283,514

(22) PCT Filed: Mar. 23, 2022

(86) PCT No.: PCT/CN2022/082483
§ 371 (c)(1),
(2) Date: Oct. 23, 2023

(87) PCT Pub. No.: WO2022/199610
PCT Pub. Date: Sep. 29, 2022

(65) Prior Publication Data
US 2024/0173859 A1    May 30, 2024

(30) Foreign Application Priority Data

Mar. 23, 2021    (CN) .......................... 202110308323.7

(51) Int. Cl.
*B25J 9/16*    (2006.01)
*B25J 17/00*    (2006.01)
(Continued)

(52) U.S. Cl.
CPC .................................. *B25J 9/1638* (2013.01)

(58) Field of Classification Search
CPC . B25J 9/1638; B25J 18/00; B25J 17/00; B25J 17/02; B25J 9/00; B25J 9/16;
(Continued)

(56) References Cited

U.S. PATENT DOCUMENTS 5,579,442 A  *  11/1996  Kimoto ..................... B25J 9/161
                                                                  700/251
10,016,900 B1 *  7/2018  Meyer ..................... B25J 9/0084
(Continued)

FOREIGN PATENT DOCUMENTS

CN       103147577 A    6/2013
CN       103206090 A    7/2013
(Continued)

OTHER PUBLICATIONS

Du Yanli "Research on distributed control and active fault-tolerant control method of reconfigurable mechanical arm" (Jun. 30, 2015).
(Continued)

*Primary Examiner* — Adam R Mott
*Assistant Examiner* — Byron Xavier Kasper
(74) *Attorney, Agent, or Firm* — Volpe Koenig (57) ABSTRACT

A method for compensating boom deflection comprising: determining a joint angle set of a boom if an end of the boom were to reach a predetermined target position when viewed as a rigid body, wherein the joint angle set comprises an angle of each joint of the boom; determining an actual position that the joint angle set causes the end to reach; determining the deviation between the actual and predetermined target positions; and when the deviation does not satisfy a predetermined condition, continuing to adjust the joint angle set until the deviation satisfies the predetermined condition. The end of the boom can consequently more
(Continued)

accurately reach the predetermined target position. The present invention further relates to a method for controlling a boom, an apparatus for compensating boom deflection, an apparatus for controlling a boom, a construction machine, and a computer-readable storage medium.

15 Claims, 3 Drawing Sheets (51) Int. Cl.
*B25J 17/02* (2006.01)
*B25J 18/00* (2006.01)
*E04G 21/04* (2006.01)

(58) Field of Classification Search
CPC ........ B25J 9/1664; B25J 9/161; B25J 9/1628; B25J 9/1679; B25J 9/1641; B25J 9/1653; B25J 9/1692; B25J 9/02; B25J 9/10; B25J 9/1005; B25J 9/1607; B25J 9/1612; B25J 9/163; B25J 9/1635; B25J 11/0075; E04G 21/0436; E04G 21/0463; G05B 2219/39176; G05B 2219/45102; G05B 19/42; Y10S 901/02
See application file for complete search history.

(56) References Cited

U.S. PATENT DOCUMENTS

| 2005/0143860 | A1* | 6/2005 | Nakajima | B25J 9/1643 700/245 |
|---|---|---|---|---|
| 2015/0120047 | A1* | 4/2015 | Motoyoshi | B25J 9/1697 901/30 |
| 2018/0169860 | A1 | 6/2018 | Fukuoka et al. | |
| 2019/0105117 | A1* | 4/2019 | Brisson | A61B 34/30 |
| 2020/0189112 | A1 | 6/2020 | Kuruvilla et al. | |
| 2021/0053407 | A1* | 2/2021 | Smith | B25J 19/021 |
| 2021/0121255 | A1* | 4/2021 | Phillips | G16H 40/63 |
| 2021/0129339 | A1* | 5/2021 | Pipe-Mazo | B25J 13/088 |
| 2022/0274255 | A1* | 9/2022 | Okawa | B25J 9/1697 |

FOREIGN PATENT DOCUMENTS

| CN | 103806665 | A | 5/2014 |
|---|---|---|---|
| CN | 108297101 | A | 7/2018 |
| CN | 108406768 | A | 8/2018 |
| CN | 109262659 | A | 1/2019 |
| CN | 109483529 | A | 3/2019 |
| CN | 110450165 | A | 11/2019 |
| CN | 110561419 | A | 12/2019 |
| CN | 112109084 | A | 12/2020 |
| CN | 113021408 | A | 6/2021 |
| DE | 102019118261 | B3 | 8/2020 |
| EP | 3705663 | A1 | 9/2020 |
| JP | 2010058256 | A | 3/2010 |
| JP | 2018099743 | A | 6/2018 |
| JP | 2020093363 | A | 6/2020 |

OTHER PUBLICATIONS

Wang Xiao Ming "Research on Trajectgory Control Technology of Concrete Pump Arm Frame Based on Arm Frame Denaturalization Compensation" Qingdao University of Science and Technology (Apr. 20, 2018) China Academic Journal Electronic Publishing House , 1994-2022.

Dai, Li "Modeling and Simulation of Concrete Pump Truck Arm System Based on Flexible Multi-Body Dynamics" Northeastern University (Dec. 2007) China Academic Journal Electronic Publishing House, 1994-2022.

Rupp, D., "Zur Fehlerkompensation und Bahnkorrektur für eine mobile Großmanipulator," (1996).

Extended European Search Report issued on May 28, 2024 for European Patent Application No. 22774266.5.

* cited by examiner

METHOD AND APPARATUS FOR COMPENSATING BOOM DEFLECTION, AND METHOD AND APPARATUS FOR CONTROLLING BOOM

CROSS REFERENCE TO RELATED APPLICATIONS

The present application claims priority of Chinese patent application No. 202110308323.7, filed on Mar. 23, 2021, the content of which is incorporated herein by reference.

FIELD OF THE INVENTION

The present disclosure relates to the field of deflection compensation, in particular to a method and apparatus for compensating a boom deflection, and a method and apparatus for controlling a boom.

BACKGROUND OF THE INVENTION

In automatic concrete spreading, a user only needs to set a position of a concrete spreading point and obtain each corresponding joint angle through an algorithm. In the prior art, a boom is simplified into a rigid body, each corresponding joint angle may be obtained through rigid inverse kinematics of the boom, however, actually the boom has large elastic deformation under the influence of gravity, resulting in the end of the boom being unable to accurately reach a position of a target concrete spreading point.

SUMMARY OF THE INVENTION

An objective of the present disclosure is to provide a method and apparatus for compensating boom deflection, and a method and apparatus for controlling a boom, which may solve or at least partially solve the above problem.

In order to achieve the above objective, an aspect of the present disclosure provides a method for compensating boom deflection. The method includes: determining a joint angle set of a boom if the end of the boom reaches a predetermined target position in a case that the boom is viewed as a rigid body, wherein the joint angle set includes a joint angle of each joint of the boom; determining an actual position that the joint angle set causes the end to reach; determining a deviation between the predetermined target position and the actual position; and adjusting the joint angle set in a case that the deviation does not satisfy a predetermined condition, and continuing to adjust the joint angle set in a case that the deviation determined according to the adjusted joint angle set does not satisfy the predetermined condition until the deviation satisfies the predetermined condition.

Optionally, the boom is a boom of a construction machine.

Optionally, adjusting the joint angle set is to adjust based on the deviation.

Optionally, adjusting the joint angle set is to adjust the joint angles of at least two joints in all joints of the boom, wherein the at least two joints are adjacent in sequence in the boom.

Optionally, selecting the at least two joints is to select in sequence starting from the end of the boom.

Optionally, an adjustment quantity of the joint angles of the at least two joints is determined according to at least one of the following: a pseudo-inverse matrix of a Jacobian matrix of a sub-boom composed of the at least two joints, the deviation and a predetermined function, wherein the predetermined function is a function of a magnitude of the deviation and decreases with decrease of the deviation, and a value range of the predetermined function is less than or equal to 1.

Optionally, the adjustment quantity is determined according to the following formula: $\Delta q = M * J * \Delta e$, wherein $\Delta q$ and $\Delta e$ are vectors, a dimension of $\Delta q$ is equal to the number of joints included in the at least two joints, an element value in $\Delta q$ is the adjustment quantity of the joint angles of the at least two joints, $\Delta e$ is the deviation, M is the predetermined function, and J is the pseudo-inverse matrix.

Optionally, the predetermined function is:

$$k(\|\Delta e\|) = 1 - \frac{1}{\left(1 + e^{(2\|\Delta e\| - 1)*6}\right)},$$

wherein $\Delta e$ is a vector, and $\Delta e$ is the deviation.

Optionally, after adjusting the joint angle set once, the method further includes: judging whether the joint angle of at least one joint in the at least two joints is within a joint limit; and in a case that the joint angle of one joint is not within the joint limit corresponding to the joint, controlling the joint angle of the joint not to be adjusted anymore; and/or reselecting at least two joints of which the joint angles are adjusted from the joints of the boom of which the joint angles are able to be adjusted, wherein the reselected at least two joints are adjacent in sequence in the joints of the boom of which the joint angles are able to be adjusted.

Optionally, in a case that the joint angle of one joint in the at least two joints is not within the joint limit corresponding to the joint after adjusting the joint angle set once, the method further includes: adjusting the joint angle of each joint in the at least two joints back to a joint angle before adjusting the joint angle set this time, wherein the step of reselecting at least two joints of which the joint angles are adjusted from the joints of the boom of which the joint angles are able to be adjusted is after the step of adjusting the joint angle of each joint in the at least two joints back to the joint angle before adjusting the joint angle set this time.

Optionally, the method further includes: increasing the number of the joints of which the joint angles are adjusted in a case that the joint angle set is adjusted again when the following conditions are satisfied: the number of times of adjusting the joint angle set exceeding a first predetermine value, the number of the joints of which the joint angles are adjusted when the joint angle set is adjusted each time being a second predetermined value, the deviation decreasing with increase of the number of times of adjusting the joint angle set, and the deviation not satisfying the predetermined condition.

Optionally, the number of times of determining the actual position that the joint angle set causes the end to reach does not exceed a third predetermined value.

Optionally, the predetermined condition is the magnitude of the deviation being less than a fourth predetermined value.

Optionally, the method is applied to automatic concrete spreading, and the fourth predetermined value is related to a concrete spreading scene.

Optionally, a value range of the fourth predetermined value is greater than 0 and less than or equal to compensation precision of a concrete spreading point.

In addition, another aspect of the present disclosure further provides a method for controlling a boom. The method includes: determining a joint angle of each joint of the boom according to the above method for compensating boom deflection, wherein the determined joint angle of each joint is the joint angle of each joint that causes a deviation to satisfy a predetermined condition; and controlling each joint of the boom according to the determined joint angle of each joint.

Correspondingly, yet another aspect of the present disclosure further provides an apparatus for compensating boom deflection. The apparatus includes: a joint angle set determining module, configured to determine a joint angle set of a boom if an end of the boom reaches a predetermined target position in a case that the boom is viewed as a rigid body, wherein the joint angle set includes a joint angle of each joint of the boom; an actual position determining module, configured to determine an actual position that the joint angle set causes the end to reach; a deviation determining module, configured to determine a deviation between the predetermined target position and the actual position; and a processing module, configured to adjust the joint angle set in a case that the deviation does not satisfy a predetermined condition, and continue to adjust the joint angle set in a case that the deviation determined according to the adjusted joint angle set does not satisfy the predetermined condition until the deviation satisfies the predetermined condition.

Optionally, the boom is a boom of a construction machine.

Optionally, the processing module adjusting the joint angle set is to adjust based on the deviation.

Optionally, the processing module adjusting the joint angle set is to adjust the joint angles of at least two joints in all joints of the boom, wherein the at least two joints are adjacent in sequence in the boom.

Optionally, selecting the at least two joints is to select in sequence starting from the end of the boom.

Optionally, an adjustment quantity of the joint angles of the at least two joints is determined according to at least one of the following: a pseudo-inverse matrix of a Jacobian matrix of a sub-boom composed of the at least two joints, the deviation and a predetermined function, wherein the predetermined function is a function of a magnitude of the deviation and decreases with decrease of the deviation, and a value range of the predetermined function is less than or equal to 1.

Optionally, the adjustment quantity is determined according to the following formula: $\Delta q = M*J*\Delta e$, wherein $\Delta q$ and $\Delta e$ are vectors, a dimension of $\Delta q$ is equal to the number of joints included in the at least two joints, an element value in $\Delta q$ is the adjustment quantity of the joint angles of the at least two joints, $\Delta e$ is the deviation, M is the predetermined function, and J is the pseudo-inverse matrix.

Optionally, the predetermined function is:

$$k(\|\Delta e\|) = 1 - \frac{1}{\left(1 + e^{(2\|\Delta e\| - 1)*6}\right)},$$

wherein $\Delta e$ is a vector, and $\Delta e$ is the deviation.

Optionally, the apparatus further includes: a judging module, configured to, after adjusting the joint angle set once, judge whether the joint angle of at least one joint in the at least two joints is within a joint limit; wherein the processing module is further configured to, in a case that the joint angle of one joint is not within the joint limit corresponding to the joint, control the joint angle of the joint not to be adjusted anymore; and/or reselect at least two joints of which the joint angles are adjusted from the joints of the boom of which the joint angles are able to be adjusted, wherein the reselected at least two joints are adjacent in sequence in the joints of the boom of which the joint angles are able to be adjusted.

Optionally, the processing module is further configured to, in a case that the joint angle of one joint in the at least two joints is not within the joint limit corresponding to the joint after adjusting the joint angle set once, adjust the joint angle of each joint in the at least two joints back to a joint angle before adjusting the joint angle set this time, wherein the step of reselecting at least two joints of which the joint angles are adjusted from the joints of the boom of which the joint angles are able to be adjusted is after the step of adjusting the joint angle of each joint in the at least two joints back to the joint angle before adjusting the joint angle set this time.

Optionally, the processing module is further configured to increase the number of the joints of which the joint angles are adjusted in a case that the joint angle set is adjusted again when the following conditions are satisfied: the number of times of adjusting the joint angle set exceeding a first predetermine value, the number of the joints of which the joint angles are adjusted when the joint angle set is adjusted each time being a second predetermined value, the deviation decreasing with increase of the number of times of adjusting the joint angle set, and the deviation not satisfying the predetermined condition.

Optionally, the number of times of the actual position determining module determining the actual position that the joint angle set causes the end to reach does not exceed a third predetermined value.

Optionally, the predetermined condition is the magnitude of the deviation being less than a fourth predetermined value.

Optionally, the apparatus is applied to automatic concrete spreading, and the fourth predetermined value is related to a concrete spreading scene.

Optionally, a value range of the fourth predetermined value is greater than 0 and less than or equal to compensation precision of a concrete spreading point.

Correspondingly, further another aspect of the present disclosure further provides an apparatus for controlling a boom. The apparatus includes: a joint angle determining module, configured to determine a joint angle of each joint of the boom according to the above method for compensating boom deflection, wherein the determined joint angle of each joint is the joint angle of each joint that causes a deviation to satisfy a predetermined condition; and a controlling module, configured to control each joint of the boom according to the determined joint angle of each joint.

In addition, further another aspect of the present disclosure further provides a construction machine. The construction machine includes: the above apparatus for compensating boom deflection; and/or the above apparatus for controlling the boom.

In addition, further another aspect of the present disclosure further provides a machine-readable storage medium, storing an instruction thereupon, wherein the instruction is used for causing a machine to execute the above method for compensating boom deflection or the above method for controlling the boom.

Through the above technical solution, in a case that the boom is viewed as the rigid body, and the deviation between the actual position that the determined joint angle set causes the end of the boom to reach and a predetermined target position does not satisfy the predetermined condition, the joint angle set is adjusted until the deviation satisfies the predetermined condition. When the deviation satisfies the predetermined condition, the actual position is very close to the predetermined target position, in this way, the deflection at the end of the boom is compensated, so that the actual position is very close to the predetermined target position, and the end of the boom may more accurately reach the predetermined target position. In addition, the joint angle of each joint included in the joint angle set that causes the deviation to satisfy the predetermined condition is the joint angle of each joint that causes the end of the boom to be able to more accurately reach the predetermined target position.

Other features and advantages of the present disclosure will be described in detail in the subsequent specific implementations.

BRIEF DESCRIPTION OF DRAWINGS

Accompanying drawings are used to provide a further understanding of the present disclosure, constitute a part of the specification, serve to explain the present disclosure together with the following specific implementations, but do not constitute a limitation on the present disclosure. In the figures.

DESCRIPTION OF REFERENCE NUMERALS

1 Joint angle set determining module 2 Actual position determining module
3 Deviation determining module 4 Processing module

DETAILED DESCRIPTION OF THE EMBODIMENTS

Specific implementations of the present disclosure are described in detail below in conjunction with accompanying drawings. It should be understood that the specific implementations described herein are only used for illustrating and explaining the present disclosure and are not used for limiting the present disclosure.

Figure 1:
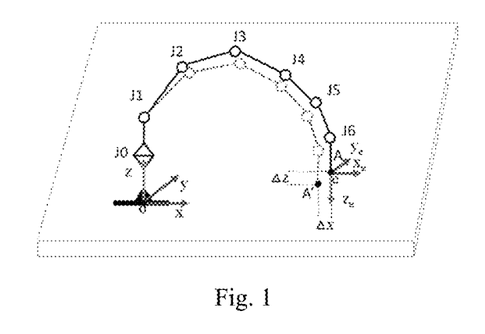
FIG. 1 is a schematic diagram of a boom provided by an embodiment of the present disclosure.

Taking a 7-degree-of-freedom boom as an example, its structure is shown in FIG. 1, and there are 7 movable joints in the boom, namely J0-J6. Assuming that A is a position that an end of the boom is expected to reach, such as an expected concrete spreading point, that is, an end point e of the boom is expected to reach the point A shown in FIG. 1. If the boom is rigid, a corresponding set of joint angles that causes the end e of the boom to reach the point A may be calculated according to its inverse motion model. It is assumed that a boom structure corresponding to the obtained set of joint angles is shown by a black solid line in FIG. 1. Due to elastic deformation of the boom, an actual end position of the boom corresponding to the set of joint angles is A', as shown by a dotted line in FIG. 1. The problem that the present disclosure can solve is how to calculate the joint angles of the boom to ensure that its end can still reach the expected position despite deformation.

An aspect of an embodiment of the present disclosure provides a method for compensating boom deflection. The boom deflection is a deviation between an actual position that the end of the boom reaches and a target position caused by a set of joint angles obtained by assuming that the end of the boom reaches the target position in a case that the boom is viewed as a rigid body due to elastic deformation of the boom.

Figure 2:
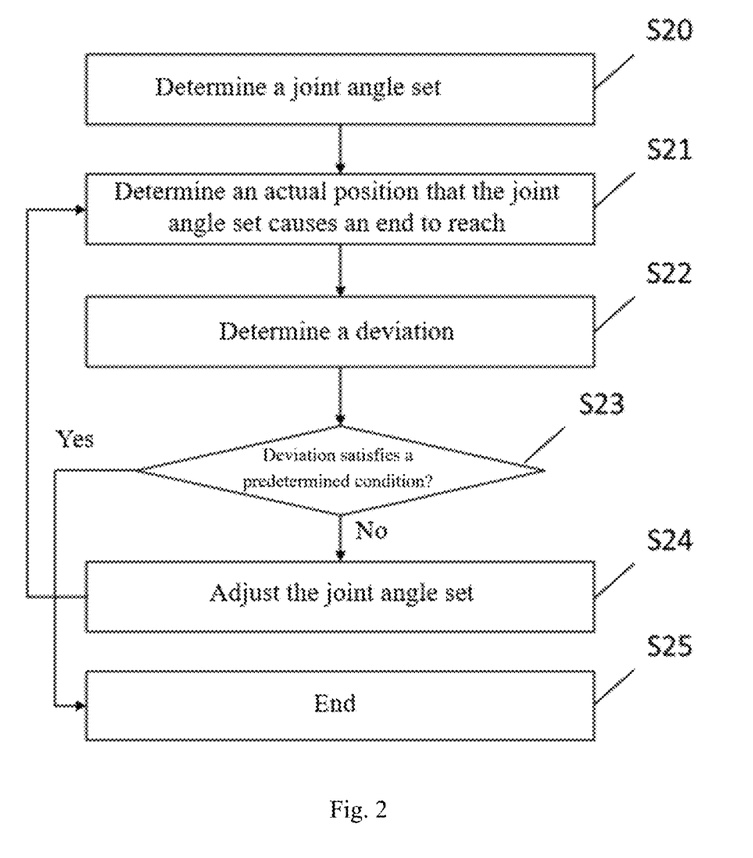
FIG. 2 is a flow chart of a method for compensating boom deflection provided by another embodiment of the present disclosure.

FIG. 2 is a flow chart of a method for compensating boom deflection provided by an embodiment of the present disclosure. As shown in FIG. 2, the method includes the following content.

Figure 3:
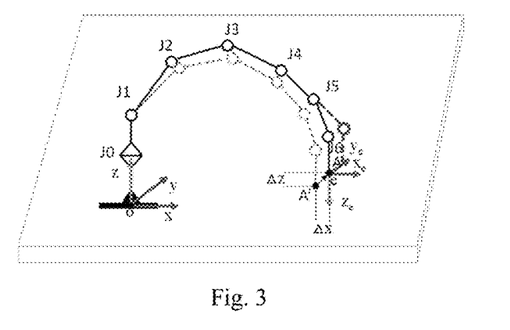
FIG. 3 is a schematic diagram of a boom provided by yet another embodiment of the present disclosure.

In step S20, a joint angle set of a boom is determined if an end of the boom reaches a predetermined target position in a case that the boom is viewed as a rigid body. The joint angle set includes a joint angle of each joint of the boom, that is to say, the joint angle set includes an angle value that each joint of the boom should reach when the end of the boom reaches the predetermined target position in a case that the boom is viewed as the rigid body. Optionally, in the embodiment of the present disclosure, rigid inverse kinematics may be adopted to determine the joint angle set. Specifically, the inverse kinematics of the rigid boom may be solved through a numerical value solution. The process involves first selecting a set of joint angles as seeds, then using a forward kinematics model to calculate a position of the end of the boom corresponding to the set of joints, calculating a deviation between the position and a target position, and mapping the deviation of the end position into a joint space through an inverse matrix of a Jacobian matrix of the boom, so as to calculate a corresponding joint angle that is able to adjust the end position to the expected target position. As shown in FIG. 3, taking a 7-degree-of-freedom boom as an example, the boom is viewed as a rigid body, and rigid inverse kinematics may be used to calculate a joint angle set q for an end e of the boom to reach a predetermined target position A. In addition, in the embodiment of the present disclosure, the joint angle of one joint is an angle between two joint arms connected by the joint. In practical situations, the angle between two joint arms of one joint has two cases of an acute angle and an obtuse angle, which may be set according to specific situations, as long as the joint angles of all joints are set the same. Optionally, in the embodiment of the present disclosure, the boom may be any boom with redundant degrees of freedom. For example, it may be a boom of a construction machine.

In step S21, an actual position that the joint angle set causes an end of the boom to reach is determined. For example, the actual position is determined by adopting a boom deflection calculating model, and the actual position that the joint angle set causes the end of the boom to reach is obtained through the boom deflection calculating model. For example, data of the end positions corresponding to different joint angles of a large number of booms is collected through a sensor to establish a big database, and then the actual position of the end of the boom is obtained by performing table lookup and fitting according to the joint angles. As shown in FIG. 3, an actual position A' that the joint angle set causes the end of the boom to reach is determined.

In step S22, a deviation between the predetermined target position and the actual position is determined. For example, the deviation may be a distance between the predetermined target position and the actual position. Alternatively, the deviation may be a vector between the predetermined target position and the actual position, as shown in FIG. 3, $\Delta e = A - A'$.

Optionally, the vector between the predetermined target position and the actual position may be determined according to a coordinate value between a coordinate value of the predetermined target position and the actual position.

In step S23, whether the deviation satisfies a predetermined condition is judged, if yes, step S25 is executed; and if not, step S24 is executed. Optionally, in the embodiment of the present disclosure, the predetermined condition may be a magnitude of the deviation being less than a fourth predetermined value. For example, when the deviation is a vector, the magnitude of the deviation is a module value of the deviation, and the predetermined condition may be the module value of the deviation being less than the fourth predetermined value. Alternatively, when the deviation is the distance between the predetermined target position and the actual position, the magnitude of the deviation may be a distance value, and the predetermined condition may be the distance value between the predetermined target position and the actual position being less than the fourth predetermined value. Optionally, in the embodiment of the present disclosure, the fourth predetermined value may be determined according to specific situations. The smaller the fourth predetermined value is, the closer the actual position of the end after deflection compensation is to the predetermined target position, or the higher the accuracy of solving the joint angle of each joint obtained by causing the end of the boom to be able to reach the predetermined target position in a case of deformation of the boom is. Optionally, in the embodiment of the present disclosure, the method for compensating boom deflection is applied to automatic concrete spreading, and the fourth predetermined value is related to a concrete spreading scene. Preferably, in the embodiment of the present disclosure, a value range of the fourth predetermined value is greater than 0 and less than or equal to compensation precision of a concrete spreading point.

In step S24, the joint angle set is adjusted. Adjusting the joint angle set is to adjust values of the joint angles included in the joint angle set. Optionally, in the embodiment of the present disclosure, the joint angle set may be adjusted according to the deviation. In addition, optionally, in the embodiment of the present disclosure, adjusting the joint angle set may be to adjust the joint angles of at least two joints in all joints of the boom, wherein the at least two joints are adjacent in sequence in the boom, and any two joints in the at least two joints are not spaced by a joint. An adjacent relationship between the at least two joints of which the joint angles are adjusted is uninterrupted, for example, taking FIG. 3 as an example for illustration, it is assumed that at least two joints include two joints. As shown in FIG. 3, the at least two joints may be joints J5 and J6, or joints J3 and J4, or joints J4 and J5 . . . , and the at least two joints are adjacent in sequence in the boom. However, the at least two joints cannot be joints J2 and J4, the joints J2 and J4 cannot be adjacent in sequence, because the joints J2 and J4 are spaced by a joint J3. Alternatively, in a case that the at least two joints include 3 joints, it may be joints J2, J3 and J4, and cannot be J2, J3 and J5, because the adjacent relationship between the joints J2, J3 and J5 is interrupted, and the joints J3 and J5 are spaced by the joint J4.

The at least two joints of which the joint angles are adjusted may be any at least two joints which are adjacent in sequence of the boom, and the joint angles of which joints of the boom are specifically adjusted may be determined according to specific situations. Optionally, in the embodiment of the present disclosure, the at least two joints of which the joint angles are adjusted may be at least two joints selected in sequence starting from the end of the boom. The at least two joints are selected in sequence starting from the end of the boom, so that the deviation can satisfy the predetermined condition as soon as possible when the joint angle set is adjusted and in a case that an adjustment amplitude is small, an operation process is reduced, and working efficiency is improved. After finishing executing step S24, step S21 to step S23 are executed again, that is to say, the actual position and the deviation are redetermined according to the adjusted joint angle set, whether the deviation satisfies the predetermined condition is judged, the joint angle set is adjusted again in a case that the deviation still cannot satisfy the predetermined condition after adjusting the joint angle set again, the deviation is determined, and whether the deviation satisfies the predetermined condition is judged until the deviation satisfies the predetermined condition. In addition, in the embodiment of the present disclosure, the number of the joints included in the at least two joints adjusted when the joint angle set is adjusted each time may be the same or not. In addition, the at least two joints adjusted when the joint angle set is adjusted each time may include the same joints as the joints adjusted when the joint angle set is adjusted last time, or joints different from the joints adjusted when the joint angle set is adjusted last time. In different cases, they may be completely different or partially different, which is not limited as long as the joint angles of at least two joints are adjusted.

In step S25, ending is performed.

Through the above technical solution, in a case that the boom is viewed as the rigid body, and the deviation between the actual position that the determined joint angle set causes the end of the boom to reach and the predetermined target position does not satisfy the predetermined condition, the joint angle set is adjusted until the deviation satisfies the predetermined condition. When the deviation satisfies the predetermined condition, the actual position is very close to the predetermined target position, in this way, the deflection at the end of the boom is compensated, so that the actual position is very close to the predetermined target position, and the end of the boom may more accurately reach the predetermined target position. In addition, the joint angle of each joint included in the joint angle set that causes the deviation to satisfy the predetermined condition is the joint angle of each joint that causes the end of the boom to more accurately reach the predetermined target position.

Optionally, in the embodiment of the present disclosure, an adjustment quantity of the joint angles of the at least two joints is determined according to at least one of the following: a pseudo-inverse matrix of a Jacobian matrix of a sub-boom composed of the at least two joints, the deviation and a predetermined function, wherein the predetermined function is a function of a magnitude of the deviation and decreases with decrease of the deviation, and a value range of the predetermined function is less than or equal to 1. Calculating the pseudo-inverse matrix of the Jacobian matrix of the sub-boom composed of the at least two joints may be solving the Jacobian matrix $J_p$ of the sub-boom first, wherein required parameters include current joint angles of the at least two joints and geometrical parameters of the sub-boom, and then solving the pseudo-inverse matrix of the Jacobian matrix. Optionally, the pseudo-inverse matrix here may be a right pseudo-inverse matrix $J_p^\dagger$, and a calculation formula is $J_p^\dagger = J_p^T (J_p J_p^T)^{-1}$.

Optionally, in the embodiment of the present disclosure, the adjustment quantity is determined according to the following formula: $\Delta q=M*J*\Delta e$, wherein $\Delta q$ and $\Delta e$ are vectors, a dimension of $\Delta q$ is equal to the number of joints included in the at least two joints, an element value in $\Delta q$ is the adjustment quantity of the joint angles of the at least two joints, $\Delta e$ is the deviation, M is the predetermined function, and J is the pseudo-inverse matrix. The dimension of $\Delta q$ is equal to the number of the joints included in the at least two joints, each element value in $\Delta q$ corresponds to the adjustment quantity of the joint angle of one joint in the at least two joints, wherein a corresponding relationship between the element value in $\Delta q$ and the joints in the at least two joints may be determined according to specific situations, which is not limited here. For example, taking the 7-degree-of-freedom boom shown in FIG. 3 as an example, the joint angles of three joints are selected for adjustment, namely joints J2, J3 and J4 respectively, $\Delta q$ is a three-dimensional vector, and a first element value, a second element value and a third element value in $\Delta q$ correspond to the adjustment quantities of the joint angles of the joints J2, J3 and J4 respectively. In addition, it may further be that the first element value, the second element value and the third element value in $\Delta q$ correspond to the adjustment quantities of the joint angles of the joints J3, J4 and J2 respectively, or the first element value, the second element value and the third element value in $\Delta q$ correspond to the adjustment quantities of the joint angles of the joints J3, J2 and J4 respectively, and so on. The corresponding relationship between the element values in $\Delta q$ and the joints of which the joint angles are adjusted may be set according to specific situations, which is not limited here.

Optionally, in the embodiment of the present disclosure, the predetermined function is:

$$k(\|\Delta e\|) = 1 - \frac{1}{\left(1 + e^{(2\|\Delta e\|-1)*6}\right)}.$$

$\Delta e$ is a vector, $\Delta e$ is the deviation, $\|\Delta e\|$ is to solve a modulus of $\Delta e$, namely a module value of $\Delta e$.

Optionally, in the embodiment of the present disclosure, after adjusting the joint angle set once, the method further includes: judging whether the joint angle of at least one joint in the at least two joints is within a joint limit; and in a case that the joint angle of one joint is not within the joint limit corresponding to the joint, controlling the joint angle of the joint not to be adjusted anymore; and/or reselecting at least two joints of which the joint angles are adjusted from the joints of the boom of which the joint angles are able to be adjusted, wherein the reselected at least two joints are adjacent in sequence in the joints of the boom of which the joint angles are able to be adjusted. At least two joints of which the joint angles are adjusted are reselected from the joints of which the joint angles are able to be adjusted, the reselected at least two joints are adjacent in sequence in the joints of the boom of which the joint angles are able to be adjusted, for example, FIG. 3 is taken as an example for illustration. It is assumed that the number of at least two joints selected each time is the same, which is 3. The at least two joints selected at a time are joints J4, J5 and J6, the joint angle of the joint J5 is prohibited from being adjusted again after the joint angle is adjusted, the reselected three joints are selected from joints J1, J2, J3, J4 and J6 and are adjacent in sequence in the joints J1, J2, J3, J4 and J6. For example, the joints J3, J4 and J6 may be selected, although from the perspective of the whole boom, the joints J3, J4 and J6 are not adjacent in sequence, the joints J4 and J6 are spaced by a joint J5, in all joints of which the joint angles can be adjusted, the joints J4 and J6 are adjacent. In the embodiment of the present disclosure, by judging whether a joint angle of a joint is within its corresponding joint limit, the adjustment of the joint angle set may be effectively performed, the joint angle set that causes the deviation to satisfy a predetermined condition is found as soon as possible, and efficiency is improved.

Optionally, in the embodiment of the present disclosure, in a case that the joint angle of one joint in the at least two joints is not within the joint limit corresponding to the joint after adjusting the joint angle set once, the method further includes: adjusting the joint angle of each joint in the at least two joints back to a joint angle before adjusting the joint angle set this time, wherein the step of reselecting at least two joints of which the joint angles are adjusted from the joints of the boom of which the joint angles are able to be adjusted is after the step of adjusting the joint angle of each joint in the at least two joints back to the joint angle before adjusting the joint angle set this time. After adjusting the joint angle set once, the joint angle of the joint of which the joint angle is prohibited from being adjusted anymore will be restricted to a joint angle value before adjusting the joint angle set this time, and the joint angle cannot be adjusted thereafter; and the joint angle of the joint of which the joint angle is not prohibited from being adjusted anymore is adjusted back to a joint angle value before adjusting the joint angle set this time. In a case that the joint angle of one joint is not within its corresponding joint limit after adjusting the joint angle set once, and after adjusting the joint angle of each joint in the at least two joints back to the angle before adjusting the joint angle set this time, at least two joints are reselected from the joints of the boom of which the joint angles can be adjusted to adjust the joint angles.

In addition, in a case that some joints are prohibited from being adjusted anymore after adjusting the joint angle set once, the number of joints included in the at least two joints of which the joint angles are adjusted when the joint angle set is adjusted next time may be the same as or different from the number of the joints of which the joint angles are adjusted this time, and has no relationship with the number of the joints of which the joint angles are adjusted this time, as long as it does not include the joints of which the joint angles are prohibited from being adjusted anymore. For example, taking FIG. 3 as an example, when the joint angle set is adjusted at a time, the number of the joints of which the joint angles are adjusted is 3, namely, the joints J4, J5 and J6 respectively. After adjusting the joint angle set this time, the joint angle of J5 is prohibited from being adjusted anymore, and then the joint angle of J5 is restricted to the joint angle before adjusting the joint angle set this time. When the joint angle set is adjusted next time, the number of the joints of which the joint angles are adjusted may be 2, 3 or other values. In addition, in a case that some joints are prohibited from being adjusted anymore after adjusting the joint angle set once, when the joint angle set is adjusted next time, the at least two joints of which the joint angles are adjusted may include one or more joints in the at least two joints of which the joint angles are adjusted this time, and may also not include the at least two joints of which the joint angles are adjusted this time.

Optionally, in the embodiment of the present disclosure, the method further includes: the number of the joints of which the joint angles are adjusted is increased in a case that the joint angle set is adjusted again when the following conditions are satisfied: the number of times of adjusting the joint angle set exceeding a first predetermine value, the number of the joints of which the joint angles are adjusted when the joint angle set is adjusted each time being a second predetermined value, the deviation decreasing with increase of the number of times of adjusting the joint angle set, and the deviation not satisfying the predetermined condition. The first predetermine value and the second predetermined value may be limited according to specific situations. Starting from adjusting the joint angle set, the second predetermined value of joints are adjusted continuously, the deviation decreases with increase of number of times of adjusting the joint angle set, and in a case that the number of times of adjusting the joint angle set exceeds the first predetermine value, but the deviation still cannot satisfy the predetermined condition, the number of the joints of which the joint angles are adjusted is increased when the joint angle set is adjusted again. The increased number of joints may be determined according to specific situations, such as adding one joint, two joints and the like. In addition, the second predetermined value of joints of which the joint angles are adjusted each time may be the same or different. If the joints adjusted each time are the same, efficiency may be improved, and the joint angle set that satisfies the condition is found as soon as possible, so that the deviation satisfies the predetermined condition. It needs to be noted that the joints adjusted each time being the same is without considering the joint limit or in a case that the joint angles of the joints are all within the corresponding joint limits, and when the joint angle of a certain joint is not within its corresponding joint limit, specific considerations need to be made according to relevant introduction in the embodiment of the present disclosure.

Optionally, in the embodiment of the present disclosure, a condition for adjusting the joint angle set again after adjusting the joint angle set once is that the number of the joints that are not controlled not to be adjusted anymore exceeds 1. That is to say, in the whole boom, joint angles of at least two joints may be adjusted.

Optionally, in the embodiment of the present disclosure, the number of times of determining the actual position that the joint angle set causes the end to reach does not exceed a third predetermined value. In the embodiment of the present disclosure, after adjusting the joint angle set, the actual position that the joint angle set causes the end of the boom to reach is redetermined, and the number of times of determining the actual position that the joint angle set causes the end of the boom to reach does not exceed the third predetermined value.

Figure 4:
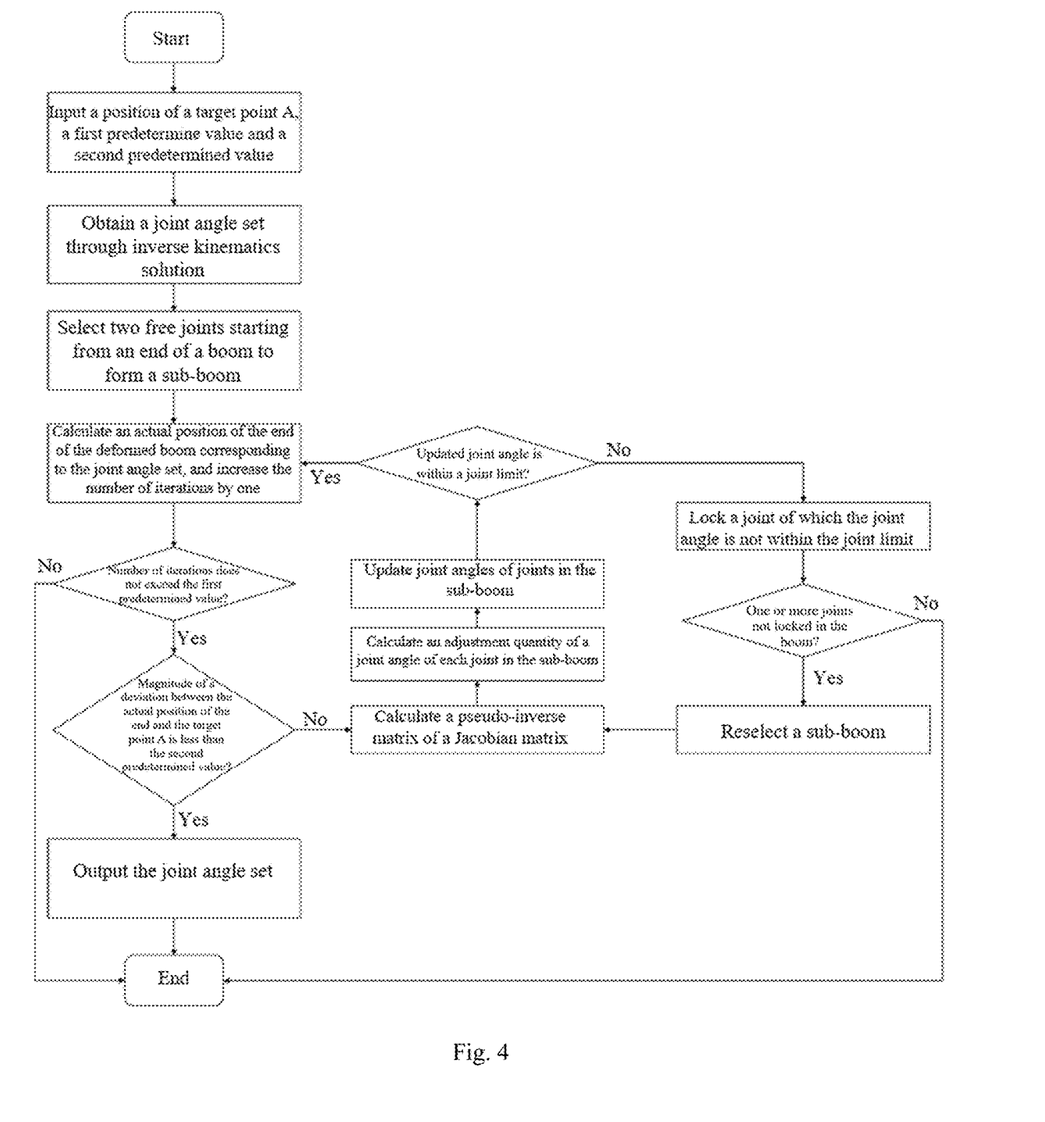
FIG. 4 is a logical schematic diagram of a method for compensating boom deflection provided by further another embodiment of the present disclosure.

FIG. 4 is a logical schematic diagram of a method for compensating boom deflection provided by another embodiment of the present disclosure. In this embodiment, the 7-degree-of-freedom boom shown in FIG. 3 is taken as an example for illustration. In addition, in the embodiment of the present disclosure, two joints are selected to adjust the joint angles when the joint angle set is adjusted each time, and the selected two joints are selected in sequence starting from the end of the boom.

In addition, in the embodiment of the present disclosure, the method for compensating boom deflection is applied to automatic concrete spreading, and the predetermined target position is a target concrete spreading point. According to the method for compensating boom deflection provided by the embodiment of the present disclosure, first, a set of joint angles that reaches the target concrete spreading point is obtained through a rigid inverse kinematics model of the boom, then a deformation quantity of the end of the boom under a state of the set of joint angles is obtained, which is a deviation between the actual position and the target concrete spreading point, some joint positions of the boom are adjusted through the deformation quantity, the joint positions are adjusted by multiple iterations, and a joint position corresponding to the target concrete spreading point is finally calculated. The joint positions are adjusted by adjusting the joint angles. The compensation method is described in detail below.

As shown in FIG. 4, the predetermined target position A, the third predetermined value and the fourth predetermined value in the above embodiment are inputted.

The boom is viewed as the rigid body, and rigid inverse kinematics is used to calculate a joint angle set q for an end e of the boom to reach the predetermined target position A.

Two free joints are selected starting from the end of the boom to form a sub-boom, the free joints are the joints of which the joint angles may be adjusted, as shown in FIG. 3, and joints J5 and J6 are selected first. Then the actual position A' that the joint angle set q causes the end e of the boom to reach is obtained through a boom deflection calculation model, the number of iterations is added by one, wherein after the joint angle set is adjusted, the actual position needs to be redetermined, and the number of iterations is the number of times of determining the actual position.

Whether the number of iterations does not exceed the third predetermined value is judged. If the number of iterations exceeds the third predetermine value, a compensation process of end deflection is finished. In addition, it may further prompt a user that the target concrete spreading point is not reachable. If the number of iterations does not exceed the third predetermined value, the deviation between the predetermined target position A and the actual position A' is calculated, $\Delta e = A - A'$, $\Delta e$ is a vector, whether a magnitude of the deviation $\Delta e$ is less than the fourth predetermined value is judged, that is, whether a module value $\|\Delta e\|$ of the deviation $\Delta e$ is less than the fourth predetermined value is judged. For example, the fourth predetermined value is represented by $\varepsilon$. $\varepsilon$ is a smaller value, the smaller the value is, the higher the accuracy of the solution is, that is, the end of the boom after compensation is closer to the expected target position, but the number of corresponding iterations may be increased. $\varepsilon$ may be set according to specific situations. For example, in automatic concrete spreading, $\varepsilon$ may be set according to a concrete spreading scene, $0 < \varepsilon \leq$ compensation precision of a concrete spreading point, and the compensation precision of the concrete spreading point is related to the concrete spreading scene. For example, when a square beam with a small size is poured, an area of a square concrete spreading opening is small, so small compensation precision is set. A calculation mode of the compensation precision of the concrete spreading point is: the compensation precision of the concrete spreading point=a minimum distance (from the target concrete spreading point to an edge of a concrete spreading opening) minus a radius of a boom hose. If the module value $\|\Delta e\|$ is greater than or equal to the fourth predetermined value, and the number of iterations does not exceed the third predetermined value, it continues to enter a next iteration process until the joint angle set that satisfies the module value $\|\Delta e\|$ being less than the fourth predetermined value is determined, then the iteration process ends, and a result is returned.

If the magnitude of the deviation is less than the fourth predetermined value, the joint angle set is outputted; and if the magnitude of the deviation does not exceed the fourth predetermined value, a pseudo-inverse matrix of a Jacobian matrix of the sub-boom is calculated, and a right pseudo-inverse matrix is adopted in this embodiment. First, the joints J5 and J6 are selected, and then the right pseudo-inverse matrix $J_{56}^{\dagger}$ of the Jacobian matrix of the sub-boom composed of the joints J5 and J6 is calculated. An adjustment quantity of the joint angle of each joint in the sub-boom is calculated. First, the joints J5 and J6 are selected, and then the adjustment quantity of the joint angle of each joint in the joints J5 and J6 is calculated. A specific method for calculating the adjustment quantity refers to the method described in the above embodiment. First, the joints J5 and J6 are selected and calculated according to the following formula $\Delta q_{56} = k(\|\Delta e\|) J_{56}^{\dagger} * \Delta e$ (1), $\Delta q_{56}$ is a two-dimensional vector, a first element value is the adjustment quantity of the joint angle of the joint J5, and a second element value is the adjustment quantity of the joint angle of the joint J6. In order to ensure convergence and increase a convergence speed of an algorithm, the predetermined function $k(\|\Delta e\|)$ decreasing with the decrease of the magnitude $\|\Delta e\|$ of the deviation is introduced, which satisfies $k(\|\Delta e\|) \leq 1$, and the following predetermined function $$k(\|\Delta e\|) = 1 - \frac{1}{\left(1 + e^{(2\|\Delta e\| - 1) * 6}\right)}$$

may be constructed. The joint angle of each joint in the sub-boom and its corresponding adjustment quantity are added to obtain updated joint angles. Whether the updated joint angle of each joint in the sub-boom is within its corresponding joint limit is judged, and each joint corresponds to its own joint limit. If the updated joint angles of all joints in the sub-boom are all within their own joint limits, the actual position of the end of the boom is redetermined according to a joint angle set composed of the adjusted joint angles, the number of iterations is added by one, and the above processes of judging the number of iterations, the magnitude of the deviation and the like are repeated. If the updated joint angle of a certain joint in the sub-boom is not within its corresponding joint limit, the joint is locked and loses its freedom, that is, joint arms connected by the joint are viewed as a whole, and the joint angle of the joint is restricted to a joint angle before adjusting the joint angle this time. Whether there is one or more joints that are not locked in the boom is judged. If there is no joint that is not locked in the boom, the compensation process of end deflection ends. In addition, after the compensation process ends, it may further prompt the user that the target concrete spreading point is not reachable. If there is one or more joints that are not locked in the boom, a sub-boom is reselected, a selection principle is that two joints that are not locked are selected in sequence stating from the end of the boom to form a new sub-boom, assuming that the selected joints are an $i^{th}$ joint and a $j^{th}$ joint, a right pseudo-inverse matrix $J_{ij}^{\dagger}$ of a Jacobian matrix of the sub-boom is calculated, and the adjustment quantities of the joint angles of the $i^{th}$ joint and the $j^{th}$ joint are calculated through the formula (1). For example, joints J5 and J6 are selected first, J5 is locked, and then two joints J4 and J6 are reselected. Then whether the updated joint angle of each joint in the reselected sub-boom is within its corresponding joint limit is judged again. If the updated joint angle of each joint in the reselected sub-boom is within its corresponding joint limit, the above processes after determining the actual position are repeated. If the updated joint angle of a certain joint in the reselected sub-boom is not within its corresponding joint limit, the above processes after locking the joint are repeated. If multiple selections result in each joint of the boom not satisfying that there is one or more joints that are not locked, the compensation process of end deflection ends. In addition, after the compensation process of end deflection ends, it may further prompt the user that the target concrete spreading point is not reachable.

If the updated joint angle of each joint in the sub-boom is within its corresponding joint limit, it enters the next iteration process, that is, the boom deflection calculation model is used to obtain an end actual position A' corresponding to the joint angle set with the updated joint angles of the joints in the sub-boom, $\Delta e$ is recalculated, whether $\|\Delta e\| < \varepsilon$ is satisfied is judged and other processes.

The embodiment of the present disclosure provides the method for compensating boom deflection, mainly including contents in the following aspects: 1) the adjustment quantities of the joints of the boom are determined according to a characteristic that the deflection of the end of the boom is a nonlinear function related with the boom configuration by using the deviation between the actual position after deformation of the boom and the expected target position, and angles of certain joints of the boom are adjusted continuously through iterative solution, so that the actual end position after deformation of the boom is gradually converged to the expected target concrete spreading point; 2) in the iteration process, the sub-boom close to the end of the boom is preferably selected to calculate the adjusted angles of the joints, and meanwhile whether the sub-boom needs to be reselected is judged according to whether the adjusted joint angles satisfy joint limit restrictions of corresponding joints; 3) in the iteration process, the joint exceeding the limit is locked, that is, the joint arms adjacent to the joint are viewed as a whole, then the joints that are not locked and close to the end of the boom are selected from the boom to form a new sub-boom, and the adjustment quantities of the joint angles of the joints included in the sub-boom are calculated; and 4) the function that decreases with the decrease of the deviation between the actual position after deformation of the boom and the expected target position is constructed, and the magnitudes of the adjustment quantities of the joint angles in the sub-boom is modulated.

According to the method for compensating boom deflection provided by the embodiment of the present disclosure, the joint angle corresponding to the flexible boom reaching the target concrete spreading point may be iteratively solved, the joint limit restriction of the boom is satisfied, the problem that in the prior art, deflection of an end of a multi-joint series-connected redundant boom cannot be compensated is solved, therefore, in an actual construction process, there is no need to manually move the boom to the target concrete spreading point for calibration of each joint angle, and a foundation is laid for an unmanned concrete spreading construction process; through a strategy that the sub-boom is preferably selected from the end of the boom, the joint angles of the joints in the sub-boom are adjusted according to the deviation between the target concrete spreading point and the end position of the boom after elastic deformation, the possibility that changes in other joints cause a compensation algorithm to fail in convergence is reduced, meanwhile redundant movement of the joints in the automatic concrete spreading process is also reduced, and construction efficiency can be effectively improved; in an iterative solution process, the joint limit of the adjusted joint angles is checked, so that a situation that an angle exceeding the joint limit restriction is calculated is avoided, a characteristic of redundant degrees of freedom of the boom is fully utilized, the joint exceeding the limit is locked, an updated joint angle is prevented from exceeding the joint limit in a next iteration process, and then the joints that are not locked in the boom are reselected to form a new sub-boom for adjustment of the joint angles, so as to improve the possibility of finding feasible solutions of the algorithm to the greatest extent; and a modulation function related to the deviation distance is introduced, so that the adjustment quantity of the joint can decrease continuously as the end position of the boom gradually approaches the target position, thereby effectively improving the convergence of the compensation algorithm and reducing the number of iterations.

In addition, another aspect of the embodiment of the present disclosure further provides a method for controlling a boom. The method includes: a joint angle of each joint of the boom is determined according to the method for compensating boom deflection described in the above embodiment, wherein the determined joint angle of each joint is the joint angle of each joint that causes a deviation to satisfy a predetermined condition; and each joint of the boom is controlled according to the determined joint angle of each joint.

Correspondingly, yet another aspect of an embodiment of the present disclosure further provides an apparatus for compensating boom deflection.

Figure 5:
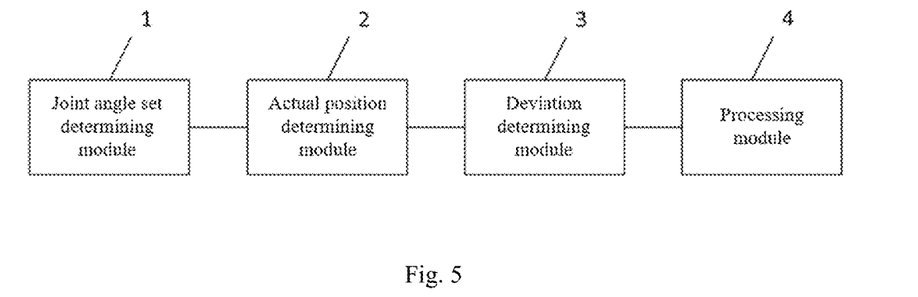
FIG. 5 is a structural block diagram of an apparatus for compensating boom deflection provided by further another embodiment of the present disclosure.

FIG. 5 is a structural block diagram of an apparatus for compensating boom deflection provided by further another embodiment of the present disclosure. As shown in FIG. 5, the apparatus includes a joint angle set determining module 1, an actual position determining module 2, a deviation determining module 3 and a processing module 4. The joint angle set determining module 1 is configured to determine a joint angle set of a boom if an end of the boom reaches a predetermined target position in a case that the boom is viewed as a rigid body, wherein the joint angle set includes a joint angle of each joint of the boom; the actual position determining module 2 is configured to determine an actual position that the joint angle set causes the end to reach; the deviation determining module 3 is configured to determine a deviation between the predetermined target position and the actual position; and the processing module 4 is configured to adjust the joint angle set in a case that the deviation does not satisfy a predetermined condition, and continue to adjust the joint angle set in a case that the deviation determined according to the adjusted joint angle set does not satisfy the predetermined condition until the deviation satisfies the predetermined condition.

Optionally, in the embodiment of the present disclosure, the boom is a boom of a construction machine.

Optionally, in the embodiment of the present disclosure, the processing module adjusting the joint angle set is to adjust based on the deviation.

Optionally, in the embodiment of the present disclosure, the processing module adjusting the joint angle set is to adjust the joint angles of at least two joints in all joints of the boom, wherein the at least two joints are adjacent in sequence in the boom.

Optionally, in the embodiment of the present disclosure, selecting the at least two joints is to select in sequence starting from the end of the boom.

Optionally, in the embodiment of the present disclosure, an adjustment quantity of the joint angles of the at least two joints is determined according to at least one of the following: a pseudo-inverse matrix of a Jacobian matrix of a sub-boom composed of the at least two joints, the deviation and a predetermined function, wherein the predetermined function is a function of a magnitude of the deviation and decreases with decrease of the deviation, and a value range of the predetermined function is less than or equal to 1.

Optionally, in the embodiment of the present disclosure, the adjustment quantity is determined according to the following formula: $\Delta q = M * J * \Delta e$, wherein $\Delta q$ and $\Delta e$ are vectors, a dimension of $\Delta q$ is equal to the number of joints included in the at least two joints, an element value in $\Delta q$ is the adjustment quantity of the joint angles of the at least two joints, $\Delta e$ is the deviation, $M$ is the predetermined function, and $J$ is the pseudo-inverse matrix.

Optionally, in the embodiment of the present disclosure, the predetermined function is:

$$k(\|\Delta e\|) = 1 - \frac{1}{\left(1 + e^{(2\|\Delta e\| - 1)*6}\right)},$$

wherein $\Delta e$ is a vector, and $\Delta e$ is the deviation.

Optionally, in the embodiment of the present disclosure, the apparatus further includes: a judging module, configured to, after adjusting the joint angle set once, judge whether the joint angle of at least one joint in the at least two joints is within a joint limit; and the processing module is further configured to, in a case that the joint angle of one joint is not within the joint limit corresponding to the joint, control the joint angle of the joint not to be adjusted anymore; and/or reselect at least two joints of which the joint angles are adjusted from the joints of the boom of which the joint angles are able to be adjusted, wherein the reselected at least two joints are adjacent in sequence in the joints of the boom of which the joint angles are able to be adjusted.

Optionally, in the embodiment of the present disclosure, the processing module is further configured to, in a case that the joint angle of one joint in the at least two joints is not within the joint limit corresponding to the joint after adjusting the joint angle set once, adjust the joint angle of each joint in the at least two joints back to the joint angle before adjusting the joint angle set this time, wherein the step of reselecting at least two joints of which the joint angles are adjusted from the joints of the boom of which the joint angles are able to be adjusted is after the step of adjusting the joint angle of each joint in the at least two joints back to the joint angle before adjusting the joint angle set this time.

Optionally, in the embodiment of the present disclosure, the processing module is further configured to increase the number of the joints of which the joint angles are adjusted in a case that the joint angle set is adjusted again when the following conditions are satisfied: the number of times of adjusting the joint angle set exceeding a first predetermine value, the number of the joints of which the joint angles are adjusted when the joint angle set is adjusted each time being a second predetermined value, the deviation decreasing with increase of the number of times of adjusting the joint angle set, and the deviation not satisfying the predetermined condition.

Optionally, in the embodiment of the present disclosure, the number of times of the actual position determining module determining the actual position that the joint angle set causes the end to reach does not exceed a third predetermined value.

Optionally, in the embodiment of the present disclosure, the predetermined condition is a magnitude of the deviation being less than a fourth predetermined value.

Optionally, in the embodiment of the present disclosure, the apparatus is applied to automatic concrete spreading, and the fourth predetermined value is related to a concrete spreading scene.

Optionally, in the embodiment of the present disclosure, a value range of the fourth predetermined value is greater than 0 and less than or equal to compensation precision of a concrete spreading point.

The specific working principle and benefits of the apparatus for compensating boom deflection provided by the embodiment of the present disclosure are similar to the specific working principle and benefits of the method for compensating boom deflection provided by the embodiment of the present disclosure, which will not be repeated here.

Correspondingly, further another aspect of the embodiment of the present disclosure further provides an apparatus for controlling a boom. The apparatus includes: a joint angle determining module, configured to determine a joint angle of each joint of the boom according to the method for compensating boom deflection in the above embodiment, wherein the determined joint angle of each joint is the joint angle of each joint that causes a deviation to satisfy a predetermined condition; and a controlling module, configured to control each joint of the boom according to the determined joint angle of each joint.

The specific working principle and benefits of the apparatus for controlling the boom provided by the embodiment of the present disclosure are similar to the specific working principle and benefits of the method for controlling the boom provided by the embodiment of the present disclosure, which will not be repeated here.

In addition, further another aspect of the embodiment of the present disclosure further provides a construction machine. The construction machine includes: the apparatus for compensating boom deflection described in the above embodiment; and/or the apparatus for controlling a boom described in the above embodiment.

In addition, further another aspect of the embodiment of the present disclosure further provides a machine-readable storage medium, storing an instruction thereupon, wherein the instruction is used for causing a machine to execute the method for compensating boom deflection described in the above embodiment or the method for controlling the boom described in the above embodiment.

The preferred implementations of the present disclosure are described in detail above with reference to the accompanying drawings. However, the present disclosure is not limited to the specific details in the above implementations, various simple variations may be made to the technical solutions of the present disclosure within the scope of the technical concept of the present disclosure, and these simple variations fall within the protection scope of the present disclosure.

In addition, it needs to be noted that the specific technical features described in the above detailed implementations may be combined in any suitable way without contradiction. In order to avoid unnecessary repetition, various possible combination methods will not be described separately in the present disclosure.

In addition, various different implementations of the present disclosure may also be combined arbitrarily, which also is to be regarded as the contents disclosed in the present disclosure as long as the concept of the present disclosure is not violated.

The invention claimed is:

1. A method for controlling a boom that compensates for boom deflection, the method comprising:
determining a joint angle set for the boom that would place an end of the boom at a predetermined target position if the boom were viewed as a rigid body, the joint angle set comprising a joint angle for each joint of a plurality of joints of the boom;
determining an actual position reached by the end when the boom is driven to the joint angle set by evaluating a deflection model of the boom that maps elastic deflection to joint angles, the model being generated from sensor-collected operating data for the boom;
determining a deviation between the predetermined target position and the actual position;
in response to the deviation not satisfying a predetermined condition, adjusting the joint angle set to obtain an adjusted joint angle set and, when a deviation determined from the adjusted joint-angle set does not satisfy the predetermined condition, continuing to adjust the joint-angle set until the deviation satisfies the predetermined condition, wherein each adjustment iteration comprises:
(i) adjusting a sub-boom composed of at least two joints that are adjacent in sequence and selected in sequence starting from the end while holding all other joints constant;
and (ii) computing an adjustment vector $\Delta q = M \cdot J\text{sub}^+ \cdot \Delta e$, where $\Delta e$ is the deviation, $J\text{sub}^+$ is a right pseudo-inverse of a Jacobian of the sub-boom, and M is a predetermined function of a magnitude of the deviation that is strictly decreasing and has a value range less than or equal to 1; and
moving the end of the boom to the predetermined target position by controlling at least two of the plurality of joints according to the adjusted joint angle set, the at least two joints being adjacent in sequence in the boom and selected in sequence starting from the end of the boom.

2. The method according to claim 1, wherein an adjustment quantity for joint angles of the at least two joints is determined according to at least one of: (i) a right pseudo-inverse of a Jacobian matrix of a sub-boom composed of the at least two joints;
(ii) the
deviation; or
(iii) a predetermined function that is a function of a magnitude of the deviation, decreases as the magnitude of the deviation decreases, and has values less than or equal to 1.

3. The method according to claim 2, wherein the adjustment quantity is determined according to:

$$\Delta q = M \cdot J\text{sub}^+ \cdot \Delta e,$$

wherein $\Delta q$ and $\Delta e$ are vectors, a dimension of $\Delta q$ is equal to a number of the at least two joints, an element of $\Delta q$ is an adjustment quantity for a corresponding joint angle of the at least two joints, $\Delta e$ is the deviation, M is the predetermined function, and $J\text{sub}^+$ is the right pseudo-inverse of the Jacobian matrix of the sub-boom.

4. The method according to claim 2, wherein the predetermined function is:

$$k(\|\Delta e\|) = 1 - \frac{1}{\left(1 + e^{(2\|\Delta e\| - 1) * 6}\right)}$$

wherein $\Delta e$ is a vector, and $\Delta e$ is the deviation.

5. The method according to claim 1, further comprising, after adjusting the joint angle set once:
   determining whether a joint angle of at least one of the at least two joints is within a joint limit;
   and, when a joint angle of one of the at least two joints is outside its corresponding joint limit: reversing a current iteration to restore joint angles of the sub-boom to values immediately before the current iteration;
   preventing further adjustment of the joint angle that is outside its limit;
   and thereafter reselecting at least two joints, from among joints whose joint angles remain adjustable, the reselected joints being adjacent in sequence.

6. The method according to claim 5, wherein reversing the current iteration comprises adjusting
   each joint angle of the sub-boom back to its value immediately before the current iteration, and wherein reselecting the at least two joints occurs after the reversing.

7. The method according to claim 1, further comprising:
   increasing a number of the plurality of joints whose joint angles are adjusted when the joint angle set is adjusted again
   upon at least one of: a number of adjustments exceeding a first
   threshold number of iterations;
   a current number of joints adjusted per iteration equaling a preset joint-count threshold;
   the deviation decreasing across adjustments but remaining above the predetermined condition; or
   the deviation not satisfying the predetermined condition.

8. A non-transitory machine-readable storage medium storing instructions that, when executed by a machine, cause the machine to execute the method according to claim 1.

9. A boom of a construction machine that compensates for boom deflection, the boom comprising:
   a plurality of joints mechanically coupling the construction machine to an end of the boom, wherein the boom is configured to:
   determine a joint angle set for the boom that would place the end at a predetermined target position if the boom were viewed as a rigid body, the joint angle set comprising a joint angle for each joint of the boom;
   determine an actual position reached by the end when the boom is driven to the joint angle set by evaluating a deflection model of the boom that maps elastic deflection to joint angles, the model being generated from sensor-collected operating data for the boom;
   determine a deviation between the predetermined target position and the actual position;
   in response to the deviation not satisfying a predetermined condition, adjust the joint-angle set to obtain an adjusted joint-angle set and, when a deviation determined from the adjusted joint angle set does not satisfy the predetermined condition, continue to adjust the joint-angle set until the deviation satisfies the predetermined condition, wherein each adjustment iteration comprises:
   (i) adjusting a sub-boom composed of at least two joints that are adjacent in sequence and selected in sequence starting from the end while holding all other joints constant; and
   (ii) computing an adjustment vector $\Delta q = M \cdot Jsub^+ \cdot \Delta e$, where $\Delta e$ is the deviation, $Jsub^+$ is a right pseudo-inverse of a Jacobian of the sub-boom, and M is a predetermined function of a magnitude of the deviation that is strictly decreasing and has a value range less than or equal to 1; and
   move the end of the boom to the predetermined target position by controlling at least two of the plurality of joints according to the adjusted joint angle set, the at least two joints being adjacent in sequence in the boom and selected in sequence starting from the end of the boom.

10. The boom to claim 9, wherein an adjustment quantity for joint angles of the at least two joints is determined according to at least one of:
    (i) a right pseudo-inverse of a Jacobian matrix of a sub-boom composed of the at least two joints;
    (ii) the deviation; or
    (iii) a predetermined function that is a function of a magnitude of the deviation, decreases as the magnitude of the deviation decreases, and has values less than or equal to 1.

11. The boom of claim 10, wherein the adjustment quantity is determined according to $$\Delta q = M \cdot Jsub^+ \cdot \Delta e,$$

wherein $\Delta q$ and $\Delta e$ are vectors, a dimension of $\Delta q$ equals a number of the at least two joints, an element of $\Delta q$ is an adjustment quantity for a corresponding joint angle of the at least two joints, $\Delta e$ is the deviation, M is the predetermined function, and $Jsub^+$ is the right pseudo-inverse of the Jacobian matrix of the sub-boom.

12. The boom according to claim 10, wherein the predetermined function is:

$$k(\|\Delta e\|) = 1 - \frac{1}{\left(1 + e^{(2\|\Delta e\| - 1) * 6}\right)}$$

wherein $\Delta e$ is a vector, and Ae is the deviation.

13. The boom according to claim 9, wherein the boom is further configured to, after adjusting the joint angle set once:
    determine whether a joint angle of at least one of the at least two joints is within a joint limit;
    and, when a joint angle of one of the at least two joints is outside its corresponding joint limit: reverse a current iteration to restore joint angles of the sub-boom to values immediately before the current iteration;
    prevent further adjustment of the joint angle that is outside its limit;
    and thereafter reselect at least two joints, from among joints whose joint angles remain adjustable, the reselected joints being adjacent in sequence.

14. The boom according to claim 13, wherein reversing the
    current iteration comprises adjusting each joint angle of the sub-boom back to its value immediately before the current iteration, and wherein reselecting the at least two joints occurs after the reversing.

15. The boom according to claim 9, wherein the boom is further configured to:
    increase a number of joints whose joint angles are adjusted when the joint angle set is adjusted again
    upon at least one of: a number of adjustments exceeding a first
    threshold number of iterations;
    a current number of joints adjusted per iteration equaling a preset joint-count threshold;
    the deviation decreasing across adjustments but remaining above the predetermined condition;

or the deviation not satisfying the predetermined condition.

* * * * *